(12) United States Patent
Friedmann et al.

(10) Patent No.: US 7,261,665 B2
(45) Date of Patent: Aug. 28, 2007

(54) TRANSMISSION ARRANGEMENT FOR A MOTOR VEHICLE

(75) Inventors: Oswald Friedmann, Lichtenau (DE); Peter Tenberge, Chemnitz (DE); Wolfgang Reik, Buhl (DE)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 173 days.

(21) Appl. No.: 10/906,600

(22) Filed: Feb. 25, 2005

(65) Prior Publication Data

US 2005/0202924 A1 Sep. 15, 2005

Related U.S. Application Data

(63) Continuation of application No. PCT/DE03/02749, filed on Aug. 16, 2003.

(30) Foreign Application Priority Data

Aug. 27, 2002 (DE) .................. 102 40 031
Mar. 3, 2003 (DE) .................. 103 09 067

(51) Int. Cl.
*F16H 3/62* (2006.01)
(52) U.S. Cl. .................................... 475/275
(58) Field of Classification Search ........ 475/275, 475/284
See application file for complete search history.

(56) References Cited

U.S. PATENT DOCUMENTS 2,045,611 A * 6/1936 Padgett .................. 475/262
3,699,826 A * 10/1972 Lumb ..................... 475/262
5,106,352 A * 4/1992 Lepelletier .............. 475/280
5,951,434 A * 9/1999 Richards et al. ........ 475/284
6,966,860 B2 * 11/2005 Heitmann et al. ........ 475/10

FOREIGN PATENT DOCUMENTS

| | | |
|---|---|---|
| CH | 592259 | 10/1977 |
| DE | 2819124 | 11/1979 |
| DE | 3038109 | 5/1982 |
| DE | 3206424 | 10/1983 |
| DE | 3523761 | 1/1986 |
| DE | 19933499 | 1/2000 |
| DE | 10113300 | 10/2002 |
| FR | 876139 | 10/1941 |
| GB | 2213227 | 8/1989 |
| WO | WO86/01569 | 3/1986 |

OTHER PUBLICATIONS

"E-Automat, Automatikgetriebe mit Espirit", Prof. Dr. Tenberge Peter, http://www.tu-chemnitz.de/mb/MaschElem/e-automat.php, Jul. 2001.

* cited by examiner

*Primary Examiner*—Dirk Wright
(74) *Attorney, Agent, or Firm*—Simpson & Simpson, PLLC

(57) ABSTRACT

The invention relates to a transmission arrangement, particularly for a motor vehicle, comprising at least one set of planetary gears and at least one dry clutch or a dry transmission brake. The inventive transmission arrangement allows advantages of the automatic transmission to be combined with the energy-saving clutches and transmission brakes.

22 Claims, 11 Drawing Sheets

| Gear | BF | BG | KanA | KanG | KDE | KDF | i | φ | φges |
|---|---|---|---|---|---|---|---|---|---|
| R |  | ▨ | ▨ |  |  | ▨ | -3,117 |  |  |
| N |  | ▨ | ▨ |  |  |  |  |  |  |
| 1 |  |  | ▨ |  |  | ▨ | 4,451 | 1,588 |  |
| 2 | ▨ |  | ▨ |  |  | ▨ | 2,803 | 1,529 |  |
| 3 |  |  | ▨ |  | ▨ |  | 1,833 | 1,490 |  |
| 4 |  |  | ▨ | ▨ |  | ▨ | 1,230 | 1,230 | 7,07 |
| 5 |  |  |  | ▨ | ▨ | ▨ | 1,000 | 1,267 |  |
| 6 |  |  |  | ▨ | ▨ |  | 0,789 | 1,252 |  |
| 7 | ▨ |  |  | ▨ |  | ▨ | 0,630 |  |  |

TRANSMISSION ARRANGEMENT FOR A MOTOR VEHICLE

CROSS REFERENCE TO RELATED APPLICATIONS

This application is filed under 35 U.S.C. §120 and §365(c) as a continuation of International Patent Application PCT/DE2003/002749, filed Aug. 16, 2003, which application is incorporated herein by reference. This application also claims priority of German Patent Applications 102 40 031.8, filed Aug. 27, 2002, and 103 09 067.3, filed Mar. 3, 2003, which applications are incorporated herein by reference.

BACKGROUND OF THE INVENTION

The invention relates to transmission arrangements for motor vehicles in which engine torque is converted into a wheel axle torque and engine speed into a wheel axle speed and shift steps, torque converters, planetary gear sets, torsional vibration dampers, clutches and electric machines may be provided in the drive train.

Six and seven gear Lepelletier automatic transmission structures (six or seven forward gears and a single reverse gear) are known which are basically a particular combination of a simple planetary gear set with a Ravigneaux gear set. Ravigneau gear sets are well known gear sets that are used in 4-speed transmission blocks, i.e., four forward gear ratios and a single reverse gear. A known six gear Lepelletier automatic transmission is illustrated in FIG. 1. Disposed in converter W, characterized by its main components pump P, turbine T and stator L, is a converter lockup clutch WK. The gear set comprises a planetary stage on the input side (3-shaft crank mechanism) and a Ravigneaux set (4-shaft crank mechanism) on the output side. Disposed between them are five wet-running clutches or brakes. FIG. 1 corresponds to the prior art of using wet, i.e., hydraulic, clutches and brakes.

BRIEF DESCRIPTION OF THE INVENTION

The parallel-shift transmission (abbreviated PSG), in accordance with the invention, having a twin-clutch transmission and at least one dry twin clutch, is a fully functionally alternative to the known converter transmissions in planetary design. By using dry clutches in the PSG, the oil pumps that are otherwise required may be eliminated, whereupon an outstanding overall efficiency is achieved with the PSG.

The object of the invention is to combine planetary gear sets with dry clutches or brakes as shift elements in order to combine the efficiency advantages of the dry clutches with the proven and simple configuration of planetary gear sets.

The transmission structures are to be provided according to the prior art with at least six forward gears and one reverse gear. In order to minimize the thermal stress of the dry starting elements, seven gear structures may also be used.

The core idea in the transition from wet clutches to dry clutches is that one divides the transmission into as few oil and dry chambers as possible. Located in the oil chambers are gears that are preferably lubricated by a churning lubrication. Located in the dry chambers are dry clutches or brakes and, at least in part, parts of the accompanying associated actuation system. When some or all of the wet clutches K1 to K3 (clutches 1 to 3) and brakes B1 and B2 (brakes 1 and 2) of prior art FIG. 1 are converted to dry clutches or brakes, not shown in FIG. 1, advantages of the present invention are obtained.

More specifically the invention is a transmission arrangement, especially for motor vehicles, wherein the transmission arrangement is provided with at least one planetary gear set and a plurality of a combination of clutches and transmission brakes wherein at least one clutch or transmission brake is a dry clutch or transmission brake. Preferably a plurality dry clutches are provided wherein at least one dry clutch or brake is in operative connection with an electronic controller and is actuated thereby.

Preferably at least one planetary gear set is assigned to an oil bath on the bottom side of the bath and this planetary gear set is at least one of lubricated and cooled by churning oil lubrication. Control of shift operations may, however, be managed without an oil circulation.

Desirably, a dry clutch or brake is actuated by means of an electromotively driven mechanism.

BRIEF DESCRIPTION OF THE DRAWINGS

The invention is explained in detail below with reference to the figures. The figures show.

DETAILED DESCRIPTION OF THE INVENTION

Figure 1:
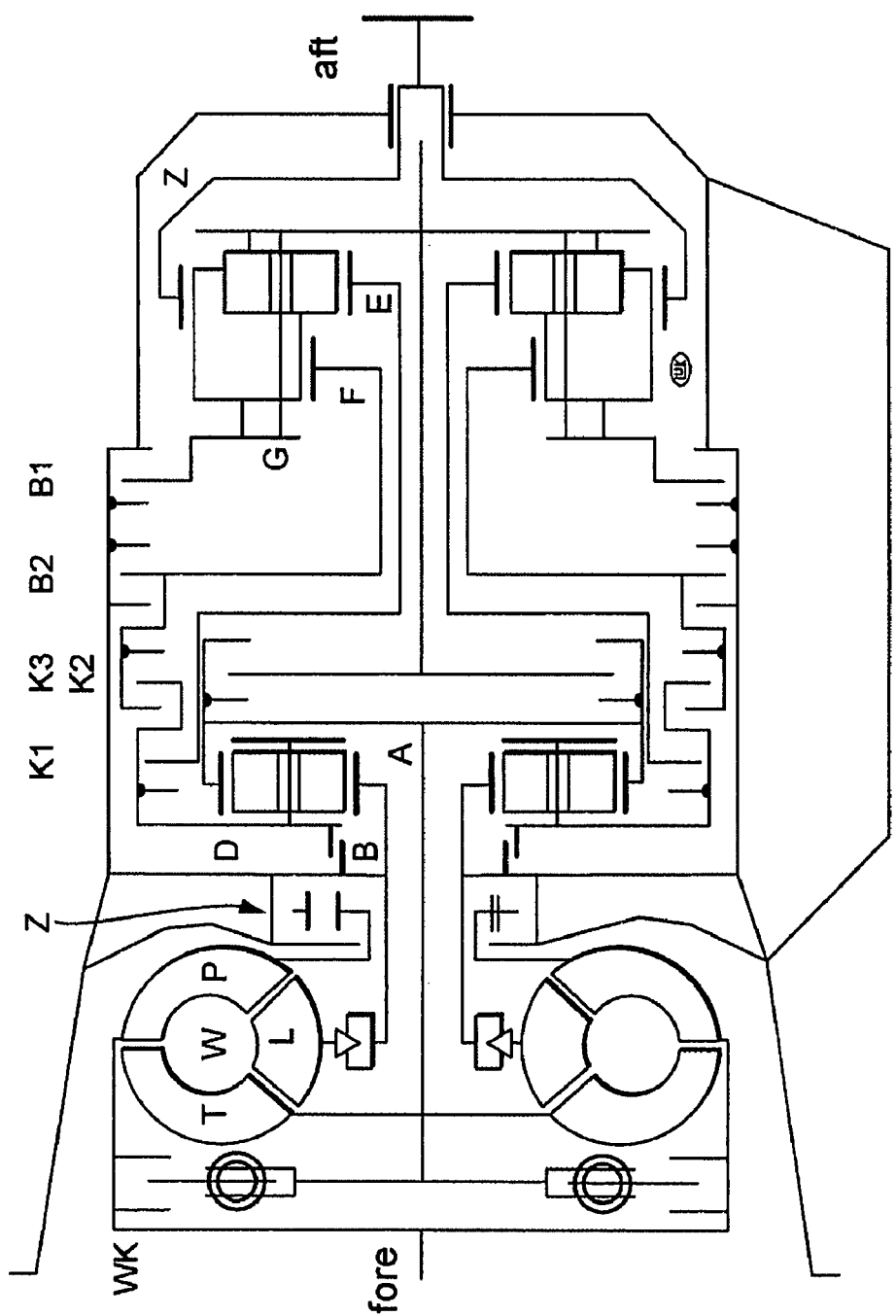
FIG. 1 shows a Lepelletier transmission structure having a torque converter.

FIG. 1 represents a new transmission arrangement if at least one clutch or one brake is operated in a dry manner, then the required amount of hydraulic fluid that must be transported via an oil pump Z (in the given case designed as a gear pump) is reduced. As a result, the required energy of the transmission arrangement is also reduced, whereupon at the same time the efficiency of the transmission arrangement increases.

In a further proposed solution (FIG. 2), the transmission is characterized by a dry chamber (four shift elements) between two oil chambers in which a twin clutch (KDE, KDF) and a twin brake (BF, BG) is housed. The designation KDE here stands for a clutch that connects the D and E branches to each other. The same is true for the clutch position in which it connects the D and F branches to each other (=KDF). The designation BF stands for brake B, which brakes the F-branch. A corresponding situation applies for the designation BG. To the left in FIG. 2, the designation KAG indicates that clutch K, which is illustrated there in the engaged state, connects branch A with branch G.

The twin clutch (KDE, KDF) connects the sun gears of the Ravigneaux set to the drive (planetary gear carrier) of the planetary stage on the input side. The combination of the two clutches in a twin clutch enables a compact and simple design. The same is true for the twin brake (BF, BG). A single clutch, which may be designed as in an automated shift transmission (ASG), having a torsional vibration damper (which may be designed as a dual-mass flywheel (ZMS); see also FIG. 5) is added between engine and transmission. The gear stepping and the shift scheme of the clutches and brakes are shown in FIG. 3. The top part of FIG. 3 reproduces the schematic structure (in this case only the top part) of FIG. 2.

Figure 4:
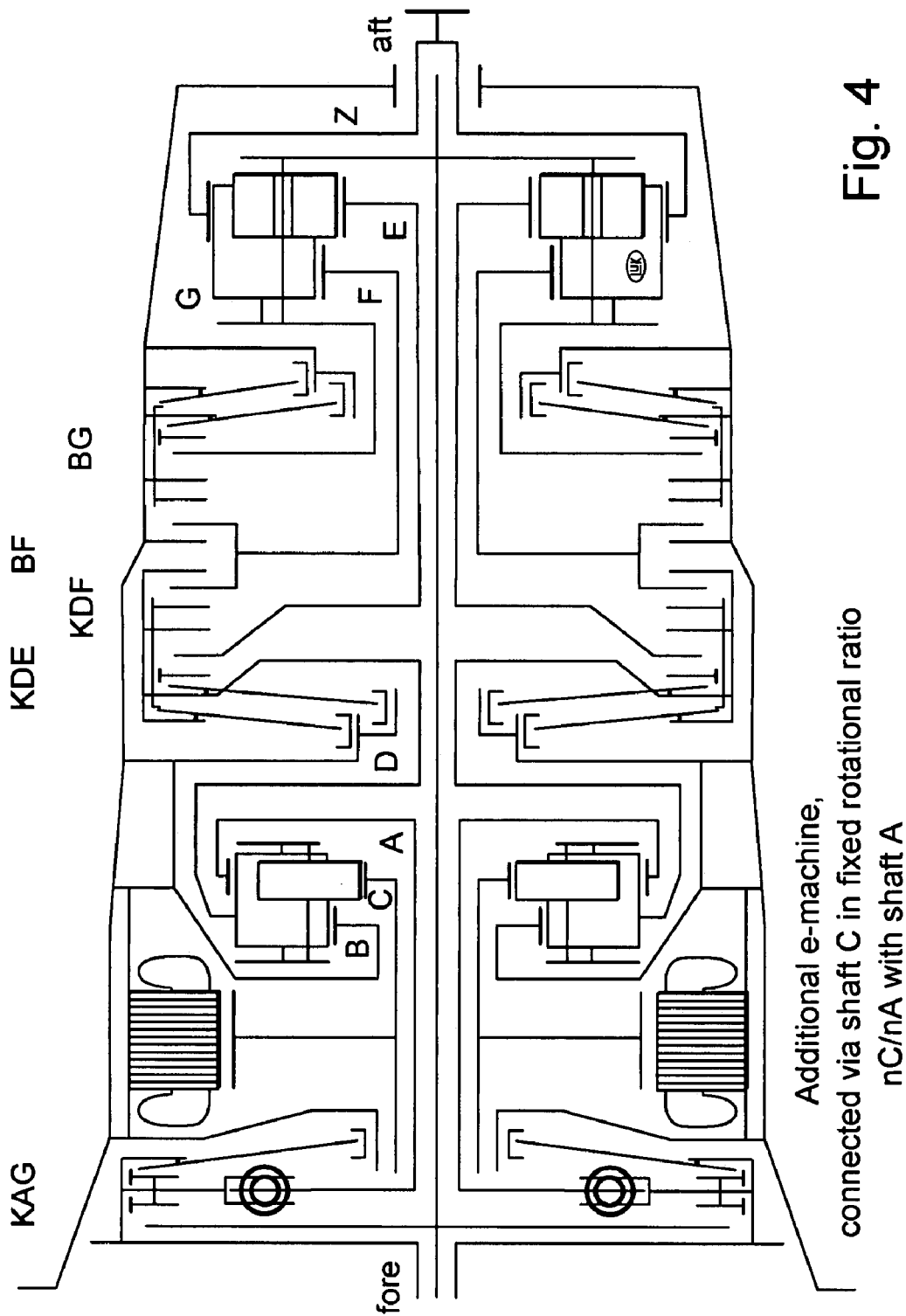
FIG. 4 shows a transmission structure having a starter-generator.

FIG. 4 shows how one may expand this transmission with an electric machine as a starter-generator. A starter-generator is advantageous because it further reduces the fuel consumption of a vehicle, especially a motor vehicle. This electric machine enables connection to the planetary stage on the input side in a fixed gear ratio. Compared to a pure crankshaft starter-generator, this has the advantage that less torque is need for cold starting (because the ratio assists), which makes the dimensioning of the electric machine easier. In other words: due to the ratio, the crankshaft-starter-generator may turn out to be smaller.

Figure 2:
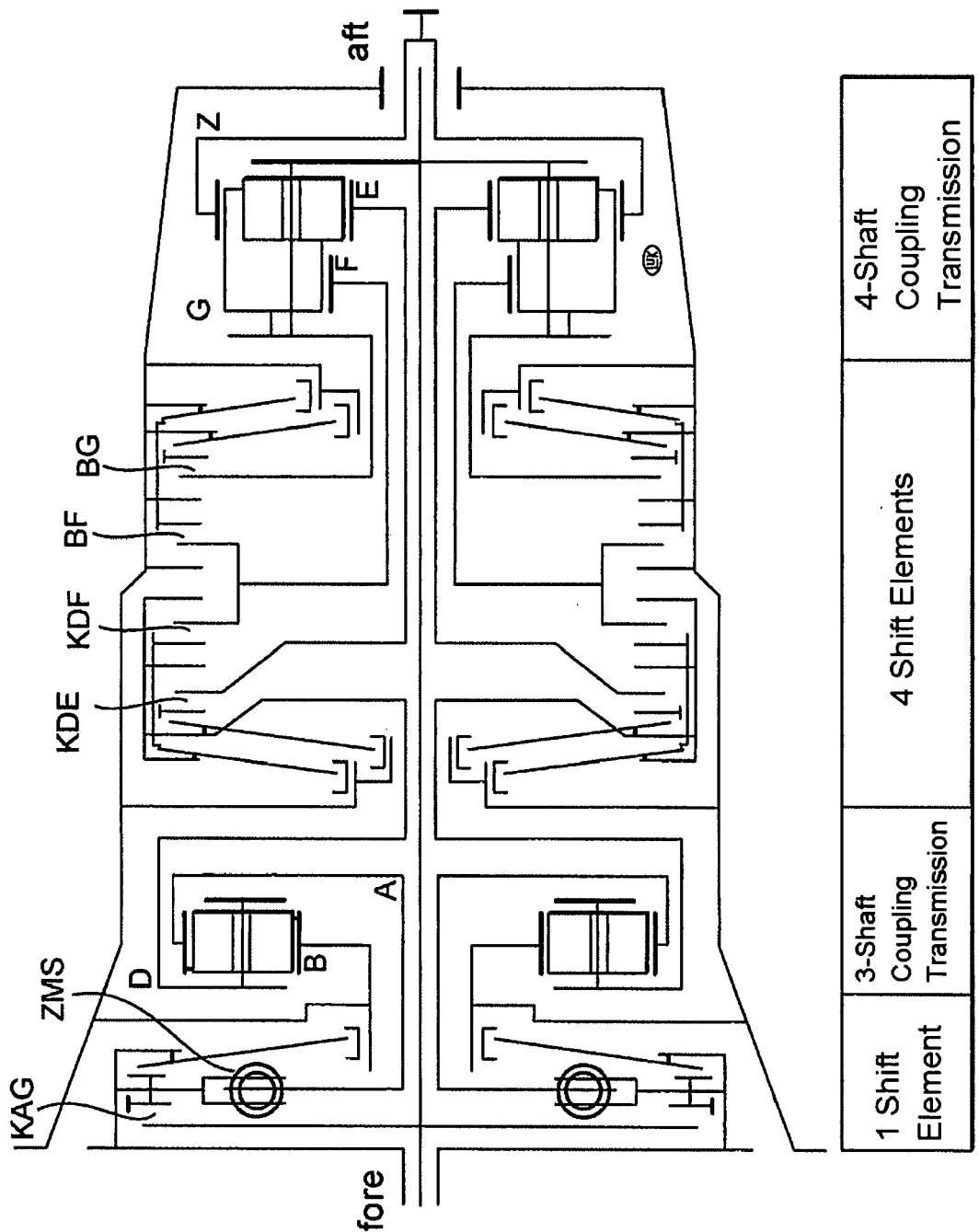
FIG. 2 shows a transmission structure having a dry chamber between two oil chambers.
Figure 3:
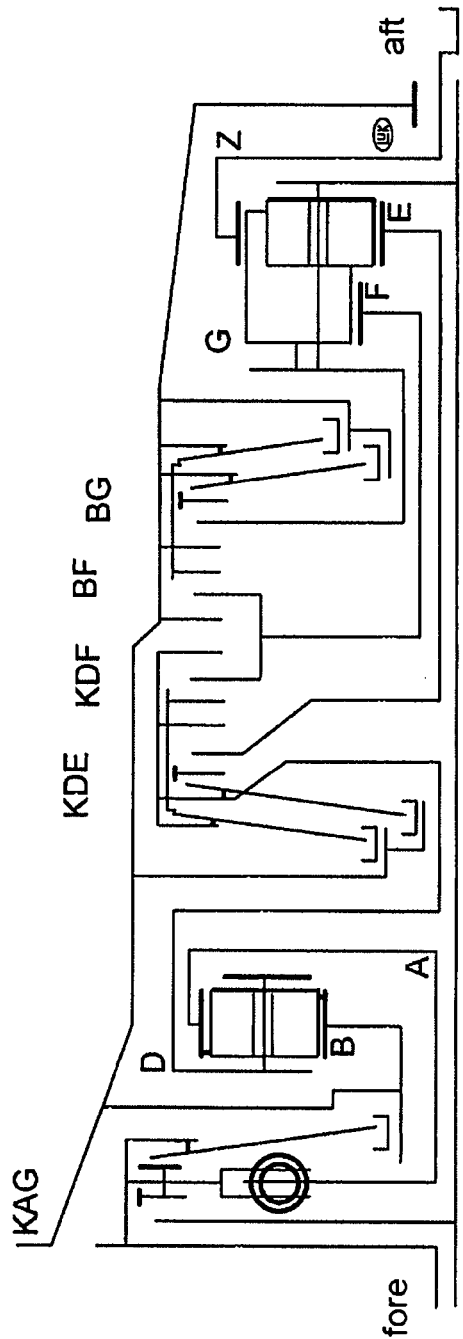
FIG. 3 shows a shift state diagram for FIG. 2.

The transmission variants of FIGS. 2, 3 or 4 can still be further improved: With only 6 gears, the drive ratio cannot be increased as desired, because otherwise the gear steps become too large. A $7^{th}$ gear would also be desirable. Furthermore, the structure with the e-machine does not offer the possibility of decoupling the internal combustion engine in the braking phases. As a result, the potential for decreasing fuel consumption cannot be optimally exploited.

Figure 5:
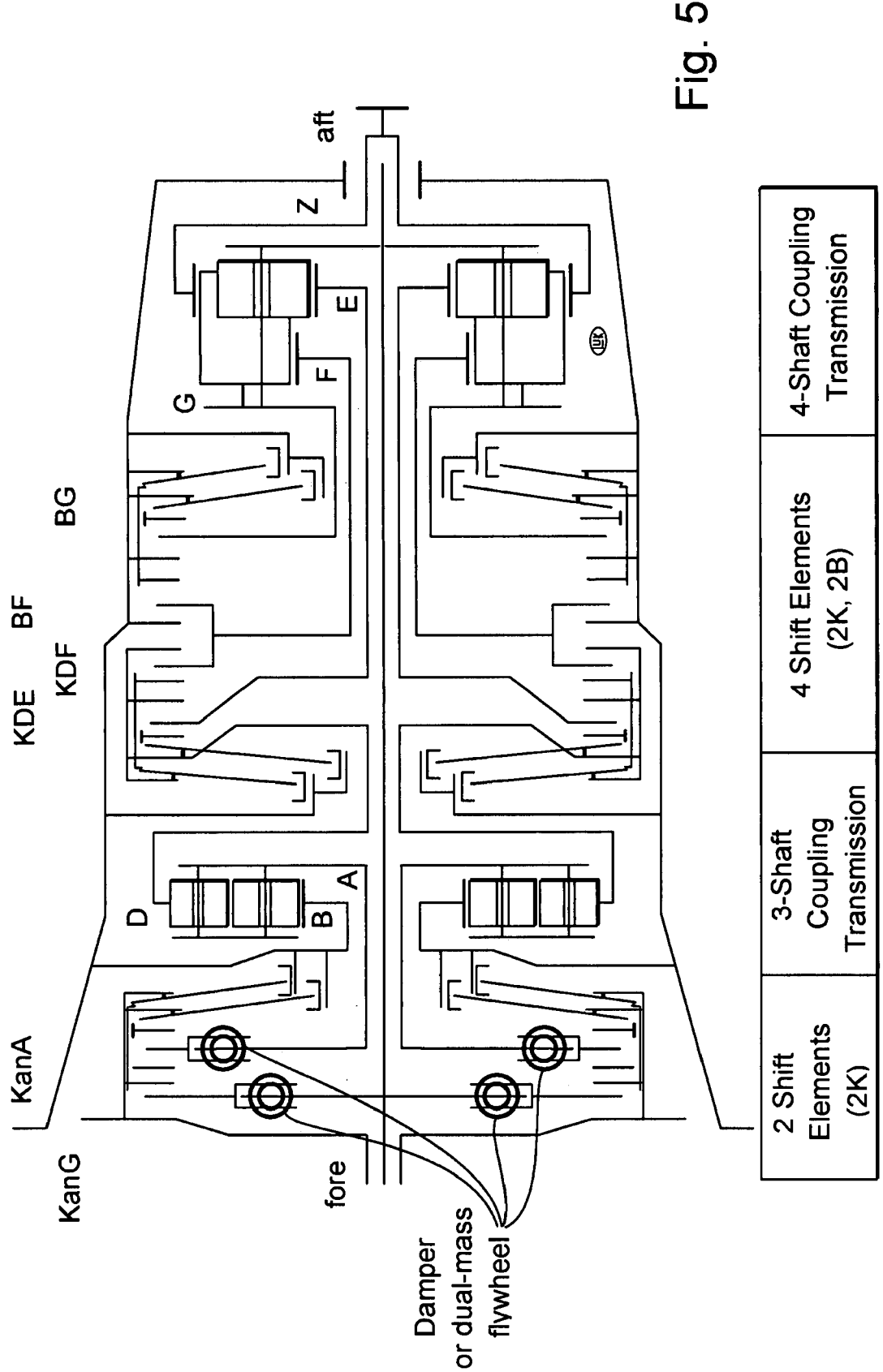
FIG. 5 shows a transmission structure having a twin clutch and a dry chamber between two oil chambers.

FIG. 5 then shows the 7-gear transmission without an electric machine. The main feature, the dry chamber having a twin clutch and a twin brake included between two oil chambers, is retained. The designations KanG and KanA signify the operational positions of twin clutch K at branch G and at branch A, respectively. This usage is also applicable for FIGS. 6 and 7. Located between engine and transmission is a second dry chamber having an additional twin clutch. The planetary gear carrier of the planetary stage on the input side may be coupled to the internal combustion engine or even be completely decoupled via the additional clutch. In this feature, this structure differs from the 6-speed Lepelletier automatic transmission, where one shaft of the planetary stage on the input side is always coupled to the crankshaft. The vibration isolation in the drive train may now be realized by slip control in the twin clutch on the input side (in connection with the depicted dampers in the clutch disks) or with a dual mass flywheel between engine and transmission.

Figure 6:
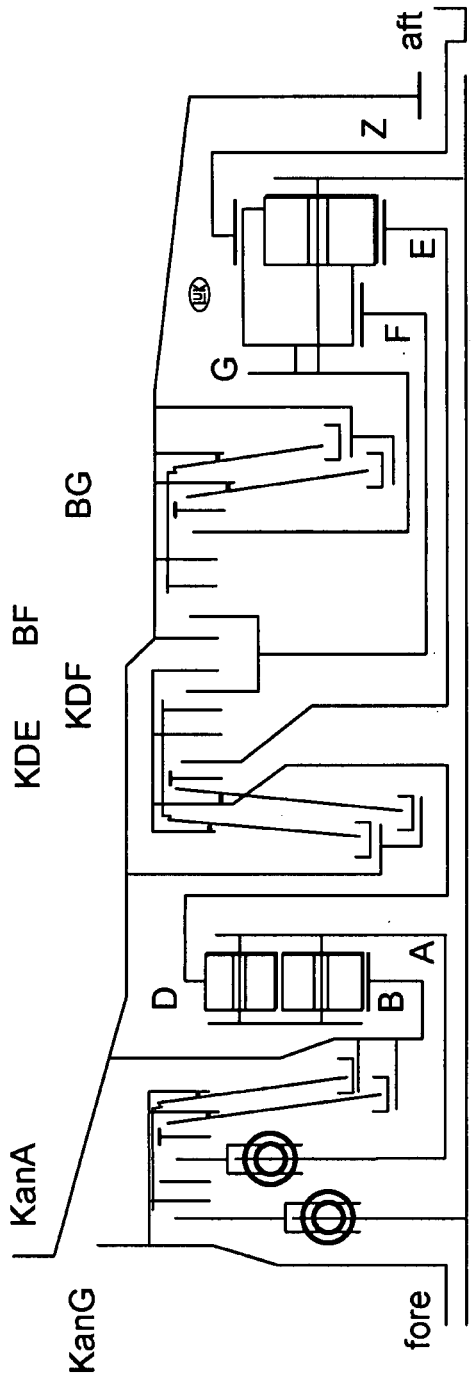
FIG. 6 shows a shift state diagram for FIG. 5.

FIG. 6 shows the shifting scheme for this transmission variant (=FIG. 5) and the ratios. In this context, an additional distinguishing feature from the 6-gear Lepelletier automatic transmission stands out: The $5^{th}$ gear of this transmission is a direct gear that, because it is direct, has an especially good efficiency.

Figure 7:
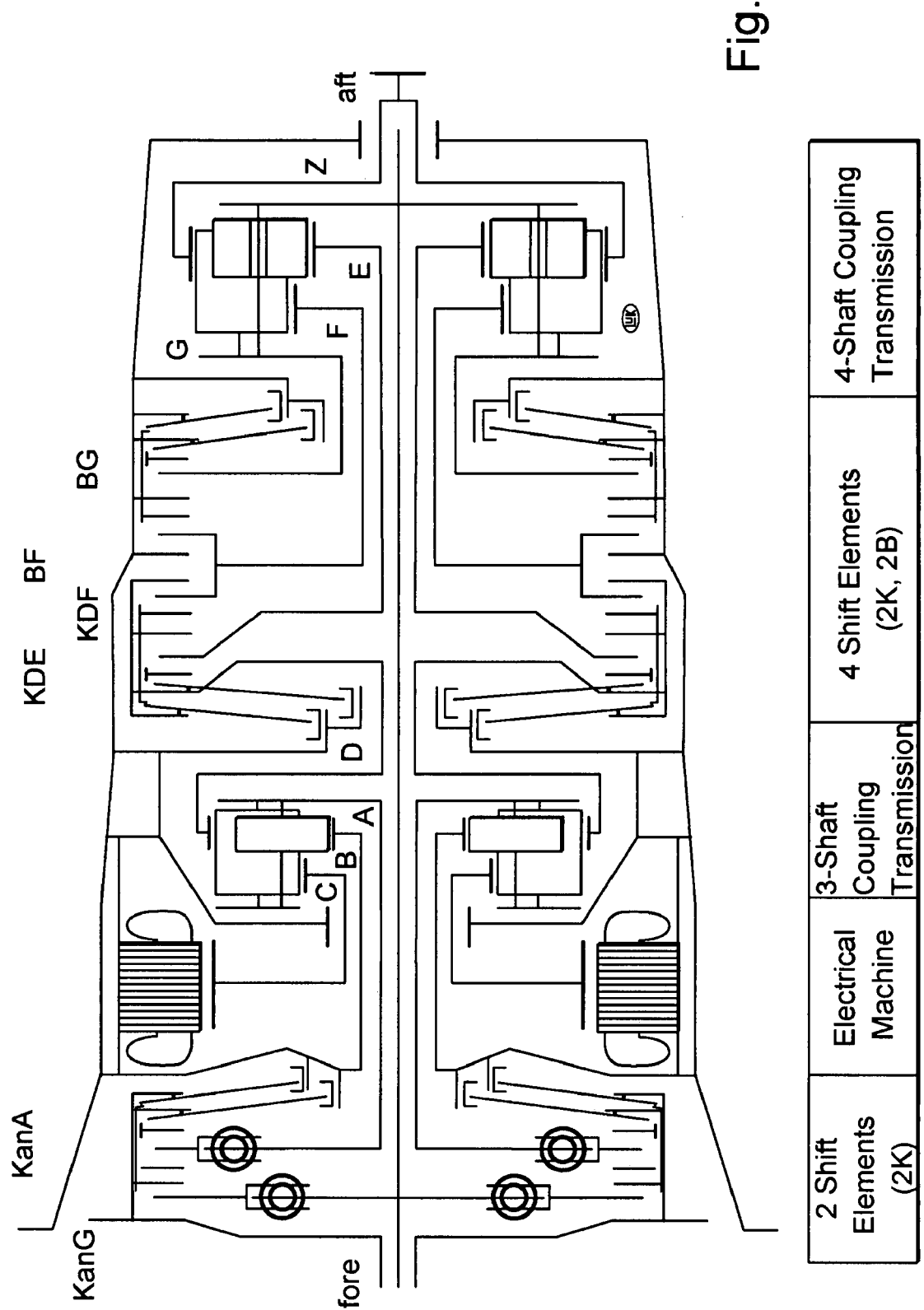
FIG. 7 shows a transmission structure having a twin clutch, two separated oil chambers and a starter-generator.

The variant in FIG. 7 is this transmission structure, but expanded with an electric machine acting as a starter/generator. The electric machine is coupled via fixed transmission ratio to the planetary stage on the input side, in this case to the planet gears. For this structure, the additional clutch adds the advantage that now the electric machine may also be decoupled from the internal combustion engine. Thus, a switching-off of the internal combustion engine in the recuperation phases and a purely electric driving are possible.

Figure 8:
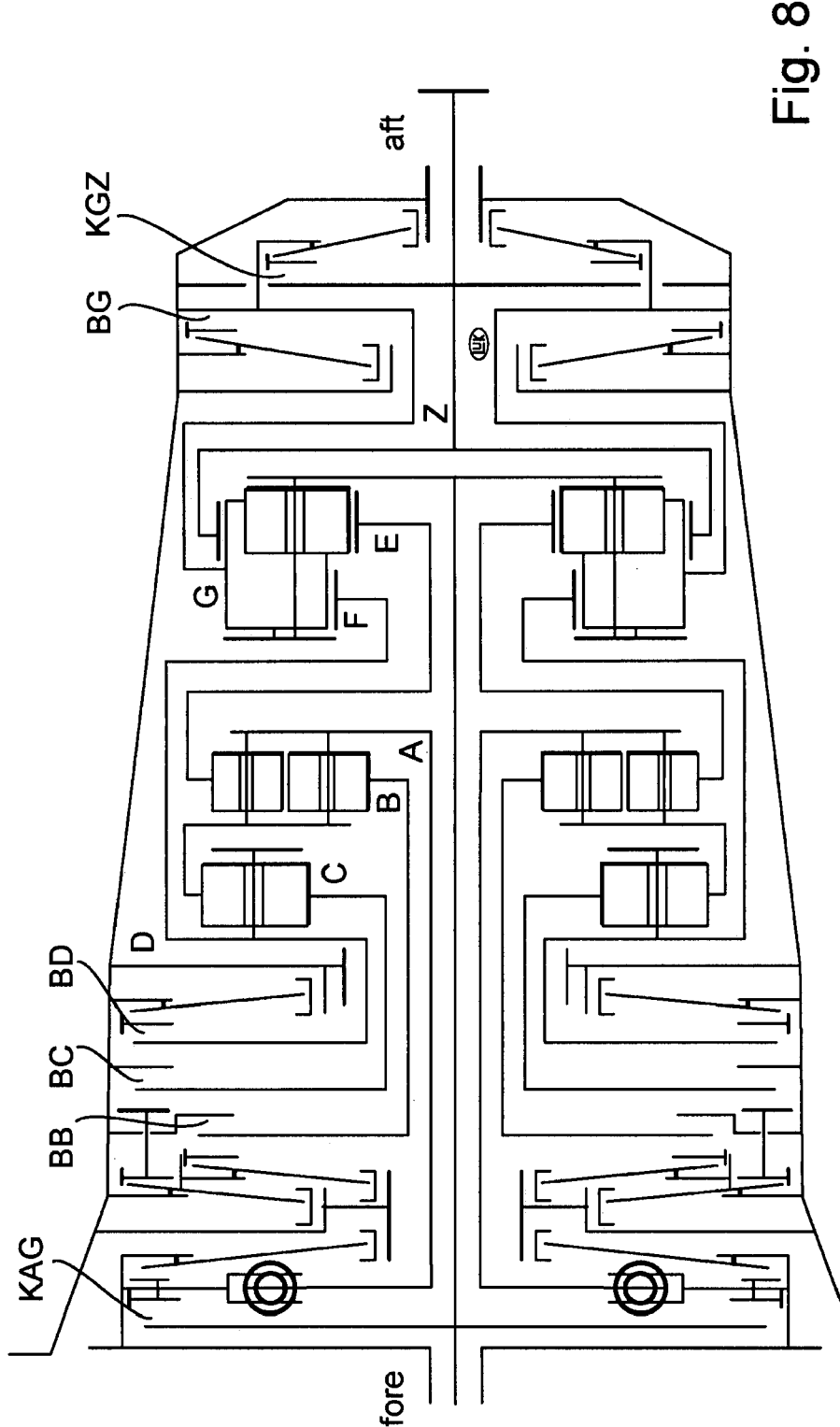
FIG. 8 shows a transmission structure having only an oil chamber.

The structural variant of a motor vehicle transmission in FIG. 8 is also a 7-gear transmission that is derived from the 6-gear variant of FIG. 2 or 3. In this variant, it was a further goal of combining the two oil chambers in order to simplify the housing and to minimize the number of gaskets needed. In order to achieve this objective, the introduction of another planetary stage is necessary. The result is therefore a 7-shaft crank mechanism having two single planetary stages (single and twin-planet-gear steps) and a Ravigneaux set. Especially advantageous in this 7-gear transmission structure is the fact that 4 of the shift elements are brakes and only 2 are clutches (KAG, KGZ). Brakes (in this case BB, BC, BD, BG) are distinguished—in contrast to clutches—by a friction part being fixed to the housing and therefore not rotated, while the additional frictional part may be pressed close to the outer diameter, whereupon brakes may be operated in a much simpler manner, because they do not need a throwout bearing nor any mechanics from the throwout bearing for the pressing element. Within the context of this invention, brakes always have a "B" as the first letter and then only one additional letter that indicates the connection to the braked part (e.g., C, altogether therefore BC). Because with a brake an operative connection to the housing is always created, a third letter is not required to label this force flow.

Figure 9:
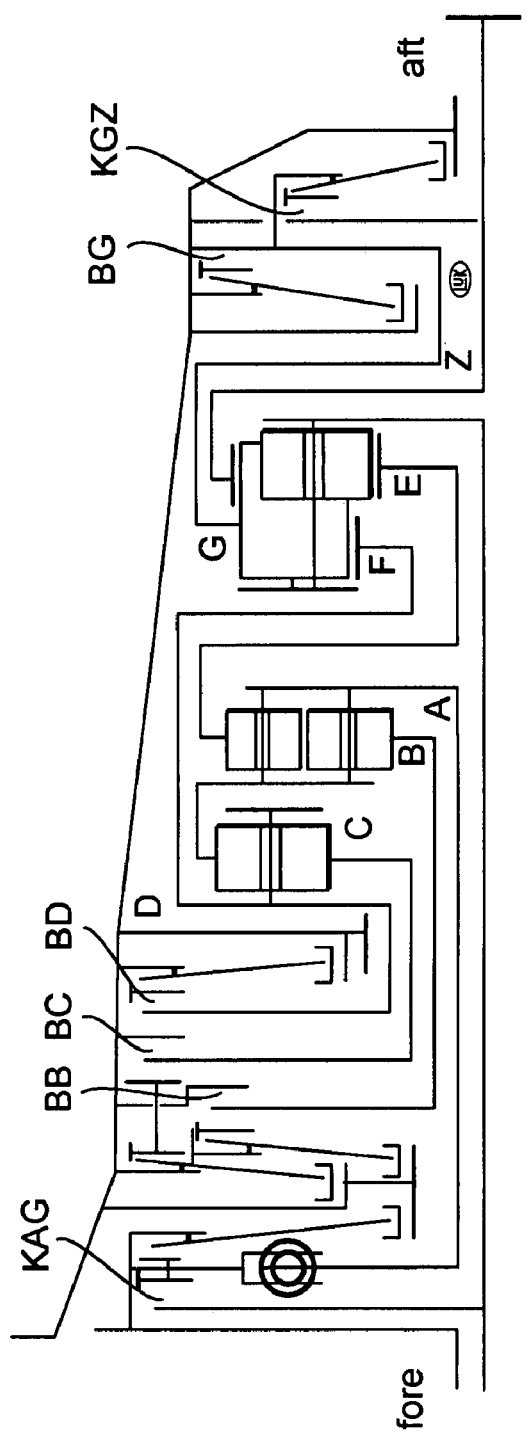
FIG. 9 shows a shift state diagram for FIG. 8.

The top portion of FIG. 9 shows the top half of FIG. 8 and is therefore a repetition. In the bottom half of FIG. 9, on the other hand, a type of shift state table regarding the assignment of the gears to the clutches and brakes to be actuated is shown. Column i indicates the ratios within the transmission. The additional ratio through a differential is not taken into account in the number i. $\phi$ indicates the transmission ratio for the next lower gear. The negative sign for the reverse gear symbolizes the reverse direction. The numerical value ($\phi$ges indicates the ratio of the $1^{st}$ gear to the $7^{th}$ gear. This ratio is also called stepping.

In the shifting state table of FIG. 9, it is apparent that clutch KAG is not needed at all for starting off in first gear or for reverse gear, rather, clutch KAG is only used for gears 4 to 7. Because the dual mass flywheel (ZMS) comprises two halves (namely, the primary and secondary side) and the clutch cover of clutch KAG is mounted on the secondary side of the dual mass flywheel, there is always a connection with the A-branch of the transmission. Via damper springs between the primary and secondary part, the A-branch (in FIG. 10 the innermost hollow shaft) is then also connected to the primary side, and thus with the internal combustion engine. If clutch KAG is engaged, then a force flow from the secondary side into central shaft 2 also occurs (see FIG. 10).

Although component KAG is not needed for the first gear or the reverse gear, the "clutch" designation is nevertheless justified because a clutch connects two rotating parts to each other. In contrast to this—as already explained above—in the brakes represented here BB, BC, BD and BG, each of the friction surfaces is connected to the housing of the transmission and thus are rotationally fixedly connected. Because of the preceding definitions, component KGZ is therefore also a clutch. According to the previous understanding of many experts, that component with which a drive train is engaged for starting off in first gear or in reverse is always a clutch. Through the language used in the invention, a new orientation of terms and ideas—even among experts—is necessary when applicable.

Furthermore, only a few selection and gear positions are discussed here in connection with FIG. 9. It may be inferred here from the table, for example, that brakes BG and BC must be engaged for starting off in reverse gear. Brakes BB and BG must be engaged for starting off in the first forward gear. In other words: In order to start off—be it forward or in reverse—there must be braking in the transmission. There is another special shifting state with gear 5. Through the indicated ratio i of 1.00, it is clear that the engine speed is abandoned without changing the transmission. For this situation, none of the brakes is actuated; instead only the two clutches KAG and KGZ are engaged.

Figure 10:
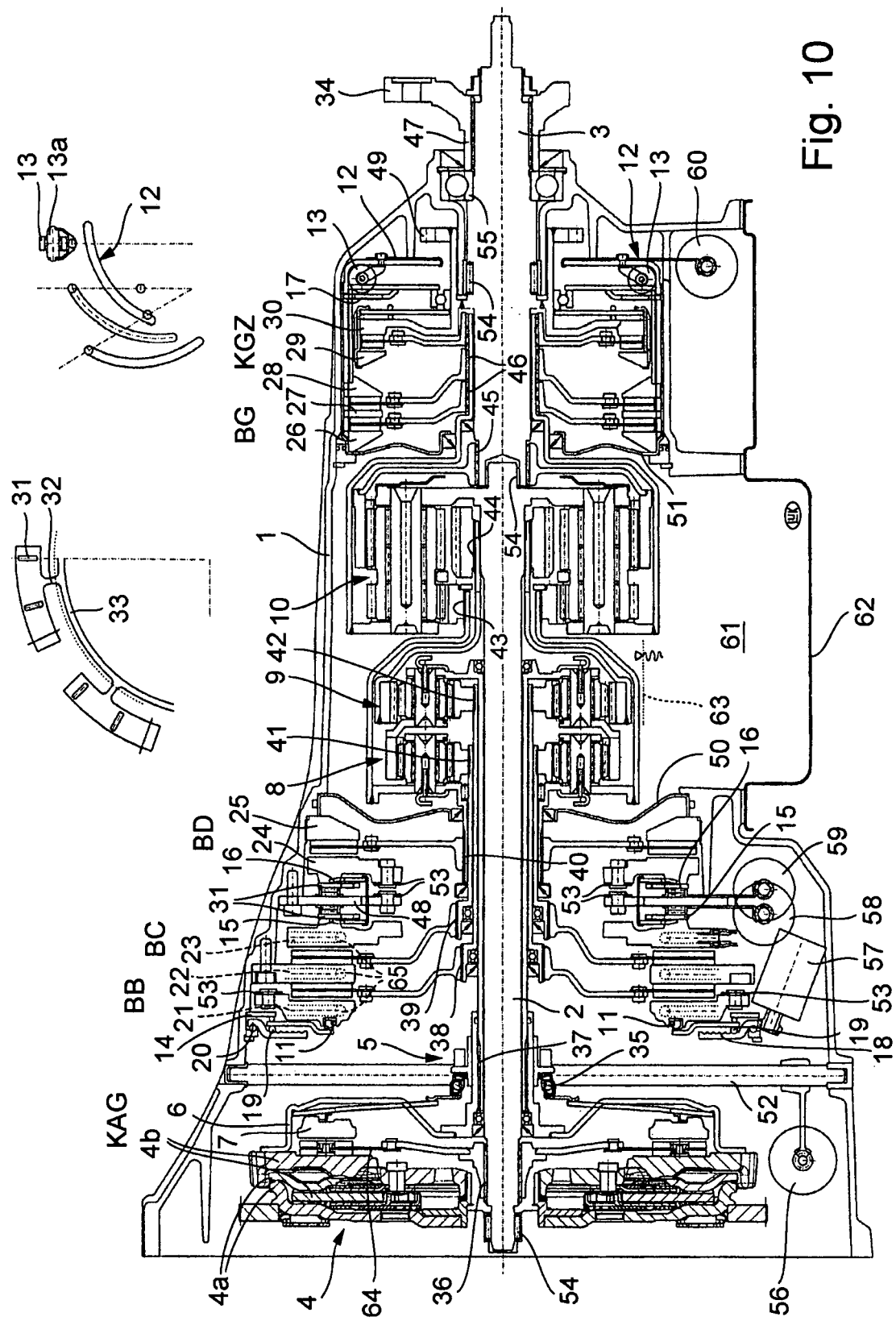
FIG. 10 shows a structural design of the transmission structure of FIG. 8; and, FIG. 11 shows a section from FIG. 10.

With FIG. 10, a possible design of the transmission arrangement from FIGS. 8 and 9 is shown. It should be said first of the figures description that perimeter lines of the rotationally symmetric parts in this illustration were consciously left out essentially in order to guarantee clarity.

In a housing 1, a central shaft 2 and an output shaft 3 that are disposed one behind the other extend in its longitudinal axis. Output shaft 3 essentially terminates in a drive flange 34. The output shaft is mounted by means of a ball bearing 55 and a needle bearing 54. Because needle bearing 54 is placed in a groove of output shaft 3, it must be a two-piece design. In other words: Needle bearing 54 comprises at least two half shells, whereby it can be mounted in the groove of output shaft 3. The left end of output shaft 3 is provided with a blind hole in which the right end of central shaft 2 is mounted by means of a needle bearing 54. This mounting is required because—except in the fifth forward gear—in this case it comes between the two shafts, again relative to the direction of rotation. The left end of central shaft 2 is likewise guided via a needle bearing 54. However, this needle bearing is located in a recess of a flywheel (not shown) or a crankshaft (not shown). One gets the impression from the previously sketched design of a transmission arrangement according to the invention that it could be unstable, because the left end of central shaft 2 is not guided before assembly of the transmission with the internal combustion engine. However, later in this description, it is explained that this stability is still there, likewise using ideas according to the invention.

Dual-mass flywheel 4 and clutch KAG also act on the left end of central shaft 2. The dual mass flywheel comprises a primary mass 4a that is screwed to the flywheel of the internal combustion engine. Primary mass 4a is connected to secondary mass 4b via an interior spring damping system. Because clutch KAG is connected to a first hollow shaft via its clutch cover 6 by means of a multi-point profile, a damping of the torsional vibrations is achieved even when a clutch KAG is disengaged. If clutch KAG is engaged—i.e. pressure plate 7 presses on clutch disk 64—a force flow is also produced via clutch disk 64 by means of multi-tooth profile 36 into central shaft 2. The engagement and disengagement of clutch KAG occurs in this exemplary embodiment via a disengagement system 5, which essentially comprises a swivel shaft 52 mounted in bearing housing 1, a pilot motor 56 having a worm gear and an eccentric. This eccentric presses on a sliding sleeve on which a throwout bearing 35 in turn is mounted.

If one then goes further to the right in the view of FIG. 10, then additional hollow shafts disposed one over the other are shown in addition to the aforementioned first inner hollow shaft. The hollow shafts are each equipped—at least at one end—with a rolling bearing. The other end of this hollow shaft may be provided with a pure friction bearing.

However, an intellectual jump must first be made when viewing the transmission arrangement from left to right. A total of three planetary gears or planetary gear sets stand out in the center of housing 1. The left planetary gear set 8 is a so-called single planetary gear set, that is, at least one planetary gear is disposed around the sun gear situated to the inside and this in turn engages in an interior gear situated to the outside. The sun gear situated to the inside is connected to a hollow shaft via a multi-point profile 41. Located to the right is a so-called twin planetary gear set 9. In the twin planetary gear set 9, the sun gear is connected via a multi-point profile 42 to a hollow shaft. At least one planetary gear engages in the sun gear, but not in the accompanying interior gear. In a twin planetary gear set according to the invention, this aforementioned planetary gear meshes with another planetary gear, which is offset in relation to the focal plane. This additional planetary gear is then engaged with the internal gear.

Located to the right next to the twin planetary gear set 9 is a Ravigneaux planetary gear set 10. Without going further into the details of the known Ravigneaux planetary gear set, it should nevertheless be mentioned that a Ravigneaux planetary gear set is equipped with two sun gears that have different diameters. The sun gears in this case are connected by means of a multi-point profile 43 and 44 to bowl-shaped or pot-shaped torque carriers.

The arrangement of the different torque carriers and the coupling of planetary gear sets 8, 9, 10 are discussed below. The planetary gear carrier of the single planetary gear set 8 along with the outer hollow shaft is connected by means of a multi-point profile 40 to the brake disk of brakes BD. This planetary gear carrier is in turn rotationally fixedly connected to a bowl-shaped torque carrier, which in turn is connected by means of the multi-point profile 43 to the larger sun gear of the Ravigneaux planetary gear set. The internal gear of the single planetary gear set 8 is also connected via a torque carrier to the planetary gear carrier of twin planetary gear set 9. The sun gear of the single planetary gear set 8 is connected by means of multi-point profile 41 to a hollow shaft, which in turn is connected via a multi-point profile 39 to the brake disk of brake BC. The sun gear of the twin planetary gear set 9 is connected by means of multi-point profile 42 via a hollow shaft further to the inside, which in turn is connected via a multi-point profile 38 to the brake disk of brakes BB. The planetary gear carriers of twin planetary gear set 9 on its right side is also connected in turn to a hollow shaft, which in turn is connected by means of the multi-point profile 37 to clutch cover 6. The interior gear of twin planetary gear set 9 is connected via a pot-shaped torque carrier by means of a multi-point profile 44 to the smaller sun gear of Ravigneaux planetary gear set 10.

The Ravigneaux planetary gear set 10 is also in turn surrounded by pot-shaped torque carriers. The outer torque carrier in this case is connected by means of a multi-point profile 46 with both the brake disks of brakes BG and therefore also connected to the clutch disk of clutch KGZ. The inner torque carrier of the Ravigneaux planetary gear set 10 is connected to its interior gear as well as via a multi-point profile 45 to output shaft 3. In Ravigneaux planetary gear set 10 there is a distinctive structural feature that a plate-shaped expansion of central shaft 2 is connected to the right end of the planetary gears—more precisely, to their bearing bolts—and these bolts are also simultaneously connected to a plate on the front face (on the left edge of Ravigneaux gear set 10). This plate on the front face is in turn connected to the outer, pot-shaped torque carriers. The entire area of the transmission arrangement in which the planetary gear set is located is oiled and cooled by an oil churning lubrication. In order for bordering, so-called dry areas not to come into contact with the oil, intermediate plates 50 and 51 are located there. These intermediate plates are sealed from housing 1—that is, a likewise stationary part—by means of, for example, an O-ring. Present between each of the intermediate plates 50 and 51 and rotating parts (shafts and hollow shafts) is a shaft sealing ring, such as a radial, lip-type sealing ring. The shaft sealing ring is labeled with an arrow, the arrow direction indicating the preferred blocking direction.

Because the individual gears are in the transmission according to the invention, in planetary gear sets 8, 9 and 10, and these gears need at least an oil lubrication and cooling on their tooth flanks, an oil chamber, which is filled with oil up to oil-fill height 63, is mounted below the planetary gear set. By immersing at least the Ravigneaux planetary gear set 10, oil is swirled, whereupon the other planetary gear sets are also covered with oil. Because the planetary gear sets are surrounded by the pot-shaped and bowl-shaped torque carriers, it is advantageous if these torque carriers are partially perforated so that the oil can better get to the tooth flanks and the bearings.

Because in the transmission arrangement according to the invention two shafts, a plurality of hollow shafts and bowl-shaped and pot-shaped torque carriers are nested inside each other and these nested components have a connection to oil chamber 61, oil can come on the left side from intermediate wall 50 or on the right side from intermediate wall 51 at the relevant places for the discharge of the oil. For this reason, shaft sealing rings are then applied there.

The shifting of gears in the transmission arrangement according to the invention can be managed using different devices. In connection with clutch KAG, a disengagement system 5 was already described. Instead of swivel shaft 52 and pilot motor 56 (in this case with a worm gear), a stationary bearing surface may also be arranged on the right side of throwout bearing 35, so that a master cylinder may be arranged between throwout bearing 35 and this stationary bearing surface, as is known, for example, from automatic transmissions having electronic clutch management. The associated hydraulic circuit and the master cylinder could then be disposed, for example, outside of the housing, where there is enough space.

For clutch KGZ and brakes BB, BC, BD and BG, other paths were followed. With brake BB, the brake disk is positioned between two pressure plates 21 and 22. Pressure plate 22 is firmly bolted to housing 1. Pressure plate 21 is axially displaceable. If it is pressed toward the right, then the brake disk is clamped between it and pressure plate 22. The movement of pressure plate 21 is effected by a pilot motor 57—in this case with a bevel gear—which turns a disk about the central shaft 2. This disk is characterized within the context of this invention as ring lever 20. Why the name was selected becomes clear from the following description. Located on the right side of ring lever 20 is a spiral crank 18, this spiral containing a plurality of windings of a groove. Located in this "record groove" is a plurality of displaceable balls 19. Ring lever 20 is itself also ball-bearing supported opposite housing 1. If there is then driving via pilot motor 57 in the corresponding direction, then displaceable balls 19 move either further inward (in the direction of central shaft 2) or further outward. These displaceable balls 19 act on another lever, which in turn acts on pressure plate 21. Another wear setting 11 may also be arranged between this lever and pressure plate 21. What is decisive in this approach is that the displaceable balls 19 are pivot points for a lever system. If displaceable balls 19 were brought to a position that is situated radially far inward, then an energy accumulator 14 (for example, designed as a diaphragm spring) exerts its force on a correspondingly long lever arm so that a high force may be exerted at the short lever arm on pressure plate 21. This high force in turn leads to brake BB being engaged. In order to prevent a rotary movement of pressure plate 21 and also in order to give pressure plate 21 a guide in the non-clamping state, it is connected with pressure plate springs 53 to housing 1.

Also brake BC acts on pressure plate 22 if it is engaged. The difference is just that the brake disk of brake BC in this case must be pressed to the left. For the pressing, pressure plate 23 must be axially moved to the left. In order for it to be possible to move pressure plate 23 to the left, and adjustment must be made between an abutment 48 and pressure plate 23 using an adjustment mechanism. This adjustment is performed in this case via a pilot motor 58, which acts by means of a worm gear on rolling bodies, which may then be displaced around the perimeter. Moreover, another energy accumulator 15 and a segmented ring lever 31 are located between pressure plate 23 and the rolling bodies (preferably slightly tapered). This segmented ring lever 31 is depicted in a small section above the main figure. Each individual segmented ring lever 31 is connected by means of an elastic bar 32 to a retaining ring 33. Indicated in the section are also the rolling bodies on which the segmented ring lever 31 rolls off, whereby in this context a pivot point is in turn changed and as a result the ratio of load to lever power arm is changed again. If a certain swivel situation is achieved for the segmented ring lever, then prestressed energy accumulator 15 (in some cases designed as a diaphragm spring) can unleash its tensioning force and in so doing press pressure plate 23 against the brake disk of brake BC.

Pilot motor 59 is driven for the actuation of brake BD. The mechanism shown for this corresponds to the one for brake BC and is symmetric to abutment 48. Therefore, a further description may be omitted here.

It is common to pressure plates 21, 22 and 23 in the figure that they are equipped with cooling water channels 65. In this context a design of the cooling water channels 65 is especially advantageous, in which the channels—relative to the depicted pressure plate width—are centrally arranged and also penetrate the pressure plate bodies in the form of chords of a circle. These channels may be produced for example by bores. In a front graphical view, the channels then depict a polygon whose corner points lie within the area of the annulus. The beginnings of the channels situated radially to the outside are then either sealed—for example, by means of a caulked ball—or designed as intake and discharge. The connections for the intake and the discharge may be flexibly configured—such as a hose or corrugated metal tubing—in an area near the pressure plate and then conducted within a rigid line. It is advantageous then if the intake and the discharge are situated diametrically opposed so that a good flushing with cooling water is possible. It is especially advantageous if, in this case even several intakes and several discharges are designed. In another embodiment of the invention, the cooling water may be drawn from the cooling line of the internal combustion engine. However, a separate cooling line may make sense for the pressure plates if, for example, the motor vehicle is equipped with a starter generator, and, during its partially exclusive operation, the cooling devices of the internal combustion engine are not available, or not sufficiently available.

On the other hand, the braking mechanism for brake BG or for clutch KGZ represents another technical solution. Brake BG in this example comprises a total of two brake disks. These are required in order to reliably absorb the braking moment occurring at them. At first glance, it is irritating that the brake disk of clutch KGZ is arranged along with its multi-point profile 46 on the same component, namely the outer torque carrier of Ravigneaux planetary gear set 10. If one looks at the shifting state diagram of FIG.

9, one determines that clutch KGZ is only needed in fifth gear. Brake BG, on the other hand, is operated in reverse gear and in first gear. Although now KGZ and brake BG must be shifted in different situations—that is, not simultaneously—it is possible to engage, for example, brake BG (and thereby disengage clutch KGZ) by means of the device that is driven by pilot motor 60 in connection with a worm gear without causing an interruption of the drive train or a forced state.

Figure 11:
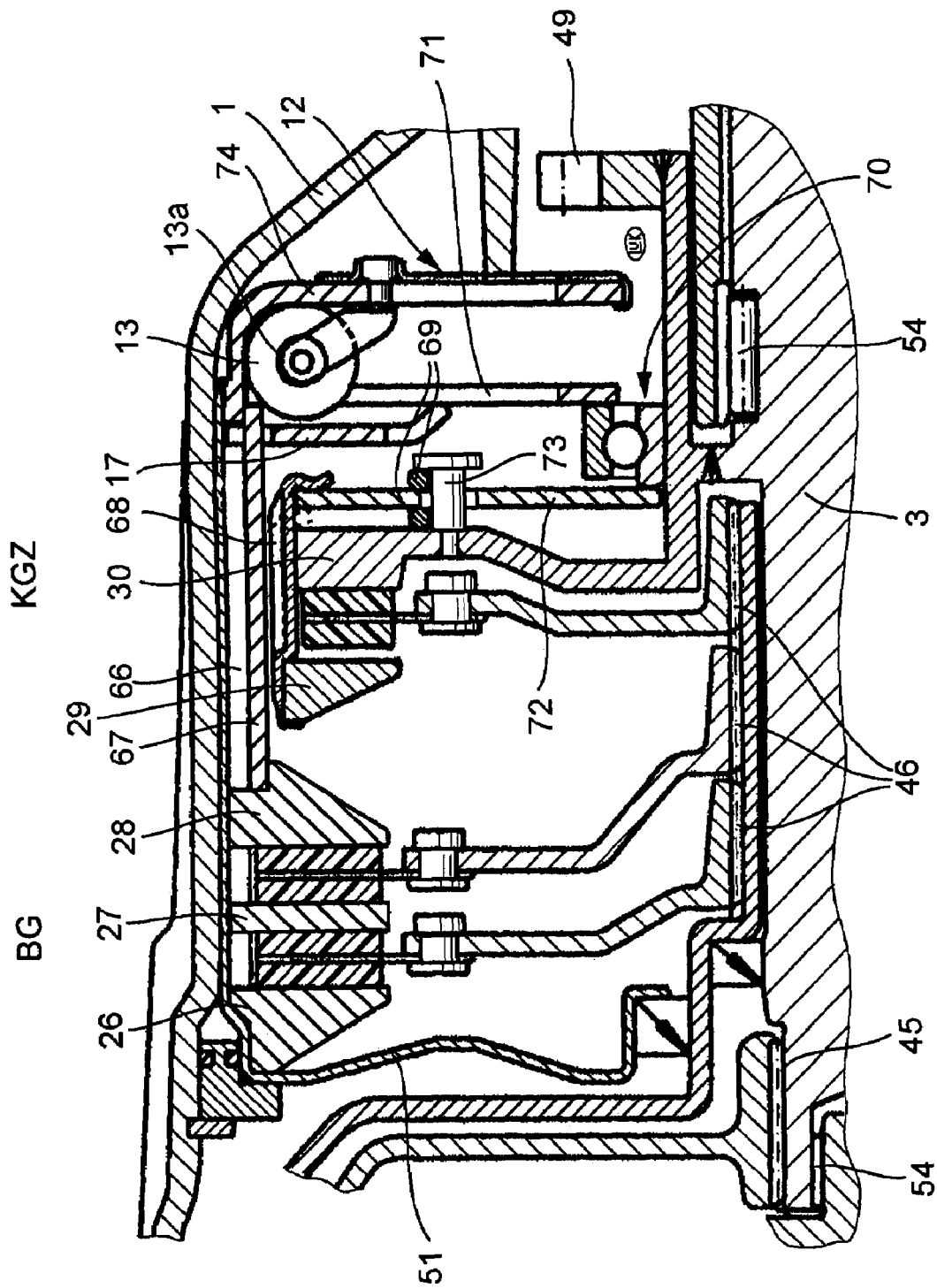

In order to show this mechanism more clearly, a sectional enlargement of this area of FIG. 10 has been drawn, which is represented in FIG. 11. In this figure, the two brake disks of brake BG, the clutch disk of clutch KGZ and pressure plates 26, 27, 28, 29 and 30 may be seen afresh in their geometry and their arrangement. Pressure plate 30 in this case may also be seen with its connection to output shaft 3 and parking gear 49. A torque carrier may be seen at the left edge of the figure, which is connected by means of multitooth profile 45 to output shaft 3. This torque carrier is connected to the sun gear of Ravigneaux planetary gear set 10. The extension on the right side of the outer torque carrier of Ravigneaux planetary gear set 10 is provided with multitooth profile 46, which rotationally fixedly couples the brake disks of brake BG and the clutch disk of clutch KGZ in the manner already described.

Intermediate plate 51 transitions into a toothed, circumferential pot profile 66. This pot profile 66 may, for example, have been welded to intermediate plate 51 after its production. However, intermediate plate 51 and pot profile 66 may also advantageously be produced in one piece via reshaping (e.g. deep drawing). Toothed pot-shaped profile 66 is also advantageous because, as a result of it, pressure plates 26, 27 and 28 may be supported via their likewise circumferential, toothed profiling in pot-shaped profile 66. If housing 1 in the area that faces pot-shaped profile 66 is likewise profiled, then the reaction forces of brake BG may be supported at housing 1.

What is decisive about FIG. 11 is the mechanism with which it is possible to shift alternately back and forth between an engaged brake BG and an engaged clutch KGZ. The changeover occurs via a crank 12 that has a plurality of spiral segments. The arrangement of the segments may be derived from a section of FIG. 10. A right-hand, front wall 74 is welded, for example, to pot-shaped profile 66. Located in this wall are, for example, radial slots in which a pin for a guide carriage of a roller 13 can slide. Roller 13 is supported in this context on the inner side of wall 74. Slots are also placed in an annular lever 71, so that roller 13 can dip into these slots. A needle bearing is preferably disposed between roller 13 and its shaft 13a. This is advantageous because shaft 13a—which is wider than roller 13—can roll off the outer side of lever 71 without rotary movements of roller 13 relative to shaft 13a being hindered. An energy accumulator 17—which is designed here as a diaphragm spring—engages with its outer end in toothed pot-shaped profile 66. The inner end of energy accumulator 17 is bent and via the pretensioning of energy accumulator 17 presses this end against lever 71. The outer and inner circumferences of energy accumulator 17 are surrounded with a plurality of slots. If roller 13 is located radially to the outside, then there is pressure via a sleeve 67 on pressure plates 26, 27, 28 and the brake disks situated between them. Brake BG is then engaged.

If roller 13 is then moved toward output shaft 3 by means of crank 12 and pilot motor 60 (see FIG. 10), which is provided with a worm/worm gear connection to crank 12, then on the one hand the pressing force on brake BG is gradually reduced, and at the same time via lever 71 a force is increased on the axially displaceable groove ball bearing, whereupon the engagement force for clutch KGZ is correspondingly increased on annular lever 72. Lever 72 is mounted by means of two wire rings 69 arranged on opposite sides and guided by stud bolts 73.

Lever 72 engages in an essentially annular bracket 68. The left edge of this bracket 68 encompasses pressure plate 29. The right edge is configured graduated in the axial direction so that an inner right edge includes the right edge of pressure plate 30. The radially outer end of lever 72 engages in the outer right edge of bracket 68. If this end then inclines to the right—due to the movement of roller 13 toward output shaft 3—then pressure plates 29, 30 gradually approach one another and pressure plates 26 to 28 are unloaded. The more roller 13 then moves radially inward—thus, clearly past the point at which the bent end of the energy accumulator rests against lever 71—the stronger the unloading of brake BG and the engagement of clutch KGZ.

If, via the aforementioned mechanics, roller 13 is moved radially outward, then the movement sequence reverses and brake BG, rather than clutch KGZ, is engaged. The mechanism for brake BG and clutch KGZ is a mechanical realization of an EXOR link with a flowing transition. The design is also very advantageous in this respect, because two shift elements (clutch KGZ and brake BG) may be operated at the same time with only one pilot motor 60 may be operated. However, this may only be applied in the present design because KGZ and BG never have to be simultaneously operated.

As was already mentioned of FIG. 10 in connection with clutch KGZ, the disengagement of throwout bearing 35 via a positioning motor 56 or via a slave cylinder in connection with a control unit is very advantageous. This is especially true if all pilot motors 56-60 are controlled by a common controller and a common program. As a result, shift points for the gears, the shifting behavior of the transmission overall (sport, defensive), may be affected with—or without—a pulling force interruption, and many other parameters may be affected just via programs.

What is claimed is:

1. A transmission arrangement, especially for motor vehicles, wherein the transmission arrangement is provided with at least one planetary gear set and a plurality of a combination of clutches and transmission brakes wherein at least one clutch or transmission brake is a dry clutch or transmission brake in operative connection with an electronic controller and is actuated thereby.

2. The transmission arrangement of claim 1 wherein a plurality dry clutches are provided.

3. A transmission arrangement, as described in claim 1, wherein, at least one planetary gear set is assigned to an oil bath on the bottom side and this planetary gear set is at least one of lubricated and cooled by churning oil lubrication.

4. A transmission arrangement, as described in claim 1, wherein the control of the shift operations is managed without an oil circulation.

5. A transmission arrangement, as described in claim 4, wherein a clutch or brake is actuated by means of an electromotively driven mechanism.

6. A transmission arrangement, as described in claim 5, wherein the mechanism comprises a plurality of lever mechanisms, which are disposed radially with respect to a central shaft or output shaft, a crank being swiveled about the axis of rotation of the central shaft or output shaft, the pivot point of at least one lever mechanism being radially displaced thereby, and wherein the ratio of a work arm to a power arm of the lever mechanism is changed.

7. A transmission arrangement, as described in claim 6, wherein the crank is provided with slots that represent spiral segments.

8. The transmission arrangement, as described in claim 6, wherein the crank is provided with a groove that is configured in a spiral shape and describes a plurality of complete circles.

9. A transmission arrangement, as described in claim 5, wherein the mechanics comprise a plurality of lever mechanisms, which are disposed in an annular configuration with respect to the central shaft or output shaft, a retaining ring (33) being swiveled about the axis of rotation of the central shaft or output shaft, the pivot point of the lever mechanisms being circumferentially displaced thereby, and wherein the ratio of the work arm to the power arm of the lever is changed.

10. A transmission arrangement, as described in claim 5, wherein the mechanics comprise a swivel lever whose shaft is essentially perpendicular to the central shaft and is driven by an electric motor via a worm gear, an eccentric disposed on the shaft pressing on a throwout bearing.

11. A transmission arrangement, as described in claim 5, wherein the mechanics comprise an electromotively driven master cylinder, an hydraulic circuit and a slave cylinder, a throwout bearing being disposed on the operative side of the slave cylinder.

12. The transmission arrangement, as described in claim 10, wherein the throwout bearing is assigned to a clutch.

13. A transmission arrangement, as described in claim 1, wherein seven forward gears of three planetary gear sets are provided.

14. A transmission arrangement, as described in claim 12, wherein, viewed from the engine side to the output side, first a single planetary gear set, then a twin planetary gear set and finally a Ravigneaux gear set are arranged.

15. A transmission arrangement, as described in claim 13, wherein the planetary gear sets are adjacent to each other, whereupon these planetary gear sets form only one common oil chamber for the churning oil lubrication.

16. A transmission arrangement, as described in claim 6, wherein the central shaft is only mounted in the output shaft and in the crankshaft of an internal combustion engine.

17. A transmission arrangement, as described in claim 1, wherein at least one of the brakes is provided with water cooling.

18. A transmission arrangement, as described in claim 17, wherein the water cooling is connected to a cooling water circuit of the internal combustion engine.

19. A transmission arrangement, as described in claim 17, wherein the water cooling is connected to a separate cooling water circuit.

20. A transmission arrangement, as described in claim 6, wherein a dual-mass flywheel is arranged between the internal combustion engine and the central shaft.

21. A transmission arrangement, as described in claim 6, wherein a clutch is arranged to transfer force between the internal combustion engine and the central shaft, a clutch cover being connected to an innermost hollow shaft and a clutch disk being rotationally fixedly joined to the central shaft.

22. A method for assembly of a transmission arrangement, as described in claim 16, wherein, before assembly of the transmission device with the internal combustion engine, the end of the central shaft at the internal combustion engine is held via an engaged brake.

\* \* \* \* \*